(12) United States Patent
Stallinga et al.

(10) Patent No.: US 7,457,217 B2
(45) Date of Patent: Nov. 25, 2008

(54) METHOD AND DEVICE FOR MEASURING THE TILT OF AN OPTICAL DISC

(75) Inventors: Sjoerd Stallinga, Eindhoven (NL); Ole Klembt Andersen, Voorburg (NL); Juil Lee, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 386 days.

(21) Appl. No.: 10/549,636

(22) PCT Filed: Mar. 10, 2004

(86) PCT No.: PCT/IB2004/000831

§ 371 (c)(1),
(2), (4) Date: Sep. 20, 2005

(87) PCT Pub. No.: WO2004/086386

PCT Pub. Date: Oct. 7, 2004

(65) Prior Publication Data

US 2006/0250914 A1    Nov. 9, 2006

(30) Foreign Application Priority Data

Mar. 24, 2003  (EP) .................. 03100760
Feb. 4, 2004   (EP) .................. 04300060

(51) Int. Cl.
    *G11B 7/08* (2006.01)
(52) U.S. Cl. .................. 369/53.19; 369/44.32
(58) Field of Classification Search .......... None
    See application file for complete search history.

(56) References Cited

U.S. PATENT DOCUMENTS

| 5,751,680 | A | * | 5/1998 | Ishibashi et al. | 369/109.01 |
| 5,768,232 | A | * | 6/1998 | Muramatsu et al. | 369/53.35 |
| 6,304,526 | B1 | * | 10/2001 | Nagashima et al. | 369/44.23 |
| 6,545,958 | B1 | * | 4/2003 | Hirai et al. | 369/44.32 |
| 2003/0058758 | A1 | * | 3/2003 | Takeda | 369/44.32 |

* cited by examiner

*Primary Examiner*—Andrea Wellington
*Assistant Examiner*—Michael V. Battaglia
(74) *Attorney, Agent, or Firm*—Michael E. Belk

(57) ABSTRACT

A method and device for measuring the tilt in an optical disc drive (1) is disclosed. The optical disc drive (1) comprises two lasers (31, 41) generating two laser beams (32, 42) having mutually different optical characteristics. One of these laser beams (32) is continuously ON, and is used for writing or reading data to or form the disc. The other laser beam (42) is repeatedly switched ON and OFF. Tilt is measured by comparing a normalized error signal (RES(ON)) during the ON-phase (TON) with a normalized error signal (RES(OFF)) during the OFF-phase.

20 Claims, 6 Drawing Sheets

METHOD AND DEVICE FOR MEASURING THE TILT OF AN OPTICAL DISC

FIELD OF THE INVENTION

The present invention relates in general to a disc drive apparatus for writing/reading information into/from an optical storage disc, wherein the disc is rotated and a write/read head is moved radially with respect to the rotating disc. The present invention is applicable in the case of optical as well as magneto-optical disc systems. Hereinafter, the wording "optical disc drive" will be used, but it is to be understood that this wording is intended to also cover magneto-optical disc systems.

BACKGROUND OF THE INVENTION

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writable type, where information may be stored by a user.

For writing information in the storage space of the optical storage disc, or for reading information from the disc, an optical disc drive comprises, on the one hand, rotating means for receiving and rotating an optical disc, and on the other hand optical means for generating an optical beam, typically a laser beam, and for scanning the storage track with said laser beam. Since the technology of optical discs in general, the way in which information can be stored in an optical disc, and the way in which optical data can be read from an optical disc, is commonly known, it is not necessary here to describe this technology in more detail.

For rotating the optical disc, an optical disc drive typically comprises a motor, which drives a hub engaging a central portion of the optical disc. Usually, the motor is implemented as a spindle motor, and the motor-driven hub may be arranged directly on the spindle axle of the motor.

For optically scanning the rotating disc, an optical disc drive comprises a light beam generator device (typically a laser diode), an objective lens for focussing the light beam in a focal spot on the disc, and an optical detector for receiving the reflected light reflected from the disc and for generating an electrical detector output signal.

During operation, the light beam should remain focused on the disc. To this end, the objective lens is arranged axially displaceable, and the optical disc drive comprises focal actuator means for controlling the axial position of the objective lens. Further, the focal spot should remain aligned with a track or should be capable of being positioned with respect to a new track. To this end, at least the objective lens is mounted radially displaceable, and the optical disc drive comprises radial actuator means for controlling the radial position of the objective lens.

In many disc drives, the orientation of the objective lens is fixed, i.e. its axis is directed parallel to the rotation axis of the disc. In some disc drives, the objective lens is pivotably mounted, such that its axis can make an angle with the rotation axis of the disc.

For any reason, the optical disc may suffer from tilt. Tilt of the optical disc can be defined as a situation where the storage layer of the optical disc, at the location of the focal spot, is not exactly perpendicular to the optical axis. The tilt can have a radial component and a tangential component. As illustrated in FIG. 6, the radial component (radial tilt) is the angular component $\beta$ of the deviation in a plane oriented transversely to the track to be read (i.e. along the radial direction R) and transversely to the data carrier, while the tangential component (tangential tilt) is defined as the angular component $\alpha$ of the deviation in a plane oriented parallel to the track (i.e. along the tangential direction T) to be read and transversely to the data carrier. Tilt can be caused by the optical disc being tilted as a whole, but is usually caused by the optical disc being warped, and as a consequence the amount of tilt depends on the location on disc. Especially systems, which have a relatively large numerical aperture (NA), are sensitive to disc tilt. Therefore, tilt compensation mechanisms have been developed. Typically, in a disc drive apparatus having tilt compensation, at least the objective lens is mounted pivotably, and the optical disc drive comprises tilt actuator means for controlling the tilt position of the objective lens so that the laser beam remain locally perpendicular to the disc surface. Alternatively, it is possible that the orientation of the disc itself is corrected.

For attenuating the effect of the disc tilt, there is thus a need for defining a method of measuring the optical disc tilt.

It is possible to measure the tilt with a separate tilt sensor. However, such solution would involve additional hardware and increased costs.

It has already been proposed in prior art to process an electrical output signal from the optical detector in order to obtain a tilt measuring signal indicating the tilt angle. Based on such a tilt measuring signal, a tilt controller can control the tilt actuator means in such a way that the tilt angle is reduced or even made zero.

The Japanese patent JP-2000 076 679-A discloses a combi-drive intended to read and write data on optical discs having different formats in using a plurality of different light beams. A first light beam, referred to as data beam, is used for the writing/reading operation. A second light beam, referred to as tilt beam, is used for tilt measurement. This combi-drive comprises means for measuring the tilt. For this purpose, the tilt beam is modulated with a predetermined modulation frequency, resulting in an electrical tilt-indicative signal component having the same frequency. A band-pass filter is thus used to derive this signal component, which is further processed for measuring tilt. This technique has some disadvantages.

On the one hand, this technique requires the use of at least a beam modulator, a band-pass filter, and a peak detector, which adds to the complexity and cost of the apparatus.

On the other hand, the tilt beam causes an electrical signal having modulation as well as a continue component, which may affect error detection based on the read signal output. The amount of influence is not constant but depends on tilt direction and magnitude, therefore the required compensation of this effect is difficult.

Further, the continuous use of the tilt beam adds to the power dissipation of the apparatus.

OBJECT AND SUMMARY OF THE INVENTION

It is an object of the present invention to provide an improved tilt measuring method and device.

To this end, the method according to the invention of measuring the tilt of an optical disc in an optical disc drive comprises:

a step of directing to the optical disc during a normal phase, a first laser beam having a first optical characteristic for writing/reading information into/from the optical disc, a step of deriving a first intermediate value from a first normalized error signal obtained after reflection of said first laser beam on the optical disc, a step of directing to the optical disc during a tilt-measuring phase, said first laser beam and a second laser beam having a second optical characteristic, a step of deriving a second intermediate value from a second normalized error signal obtained after reflection of said first and second laser beams on the optical disc, a calculation step of deriving a tilt-indicative signal from the difference between said second and first intermediate values.

The principle of the present invention is to use a first light beam, referred to and used as data beam, and a second light beam, referred to and used as tilt beam, having different optical characteristics, which results in different tilt sensitivities measured by a photo detector. The optical characteristics, which influence the tilt sensitivity, are for instance the wavelength, focus, spherical aberration, polarization. In using different laser beams, any disc tilt results in a detectable difference between on the one hand a tilt-induced deflection of the detector spot of the first light beam and on the other hand a tilt-induced deflection of the detector spot of the second light beam. The second light beam is alternatively switched ON and OFF. Tilt measurements are performed during the time periods during which the tilt beam is ON.

The invention also relates to an optical disc drive apparatus where a first light beam is used for the writing/reading operation while a second light beam is used for tilt measurement. This apparatus comprises means for implementing the steps of the above-mentioned method according to the invention.

In particular, this optical disc drive apparatus corresponds to a combi-drive capable of handling two or more different disc types, such as for instance CD, DVD, Blu-Ray, with two or more different laser beams.

This optical disc drive apparatus may also correspond to a drive capable of handling only one disc types, such as for instance CD or DVD, although this would require the installation of an additional optical system for generating the second laser beam used for tilt measurement.

In a preferred embodiment of the invention, the duration of the tilt-measurement phases is chosen such as to be shorter than a relevant time scale of expected changes of the error signals intended to correct the three dimensional position of the objective lens. As a consequence, any possible influence of the tilt beam on the error signal does not affect the control of the actuators. Moreover, since the tilt beam is not used continuously, the power dissipation of the apparatus is limited.

In a preferred embodiment of the invention, at least one error signal is ignored during said tilt-measurement phases, so that at least one lens actuators is frozen during said tilt-measurement phases.

It is an extra feature and precaution to ensure that the control of the actuators is not affected during the tilt measurement, whatever the duration of the tilt measurement.

BRIEF DESCRIPTION OF THE DRAWINGS

These and other aspects, features and advantages of the present invention will be further explained by the following description with reference to the drawings, in which same reference numerals indicate same or similar parts, and in which.

DETAILED DESCRIPTION OF THE INVENTION

Figure 1A:
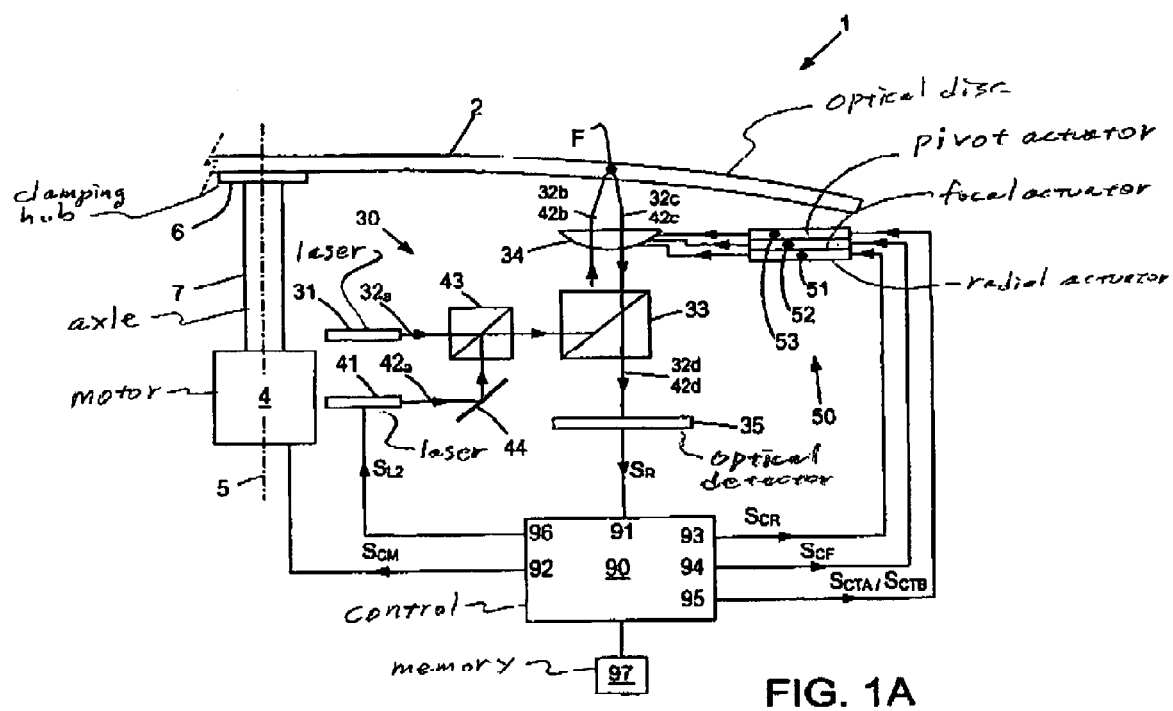
FIG. 1A schematically illustrates an optical disc drive.

FIG. 1A schematically illustrates an optical disc drive apparatus 1, suitable for storing information on or reading information from an optical disc 2, typically a DVD or a CD. For rotating the disc 2, the disc drive apparatus 1 comprises a motor 4 fixed to a frame (not shown for sake of simplicity), defining a rotation axis 5. For receiving and holding the disc 2, the disc drive apparatus 1 may comprise a turntable or clamping hub 6, which in the case of a spindle motor 4 is mounted on the spindle axle 7 of the motor 4.

The disc drive apparatus 1 further comprises an optical system 30 for scanning tracks (not shown) of the disc 2 by an optical beam. More specifically, in the exemplary arrangement illustrated in FIG. 1A, the optical system 30 comprises a first light beam generating means 31 and a second light beam generating means 41, each typically a laser such as a laser diode, each arranged to generate a first light beam 32 and a second light beam 42, respectively. In the following, different sections of the optical path of a light beam 32, 42 will be indicated by a character a, b, c, etc added to the reference numeral 32, 42, respectively.

The first light beam 32 passes a first beam splitter 43, a second beam splitter 33 and an objective lens 34 to reach (beam 32b) the disc 2. The beam splitters are schematically depicted as cubes, but may have other implementations. The first light beam 32b reflects from the disc 2 (reflected first light beam 32c) and passes the objective lens 34 and the second beam splitter 33 (beam 32d) to reach an optical detector 35.

The second light beam 42 is reflected by a mirror 44, passes the first beam splitter 43, and then follows an optical path comparable with the optical path of the first light beam 32, indicated by reference numerals 42b, 42c, 42d.

The objective lens 34 is designed to focus one of the two light beams 32b, 42b in a focal spot F on a recording layer (not shown for sake of simplicity) of the disc 2, which spot F normally is circular.

In the following, the first beam 32 will be referred to as data beam while the second beam 42 will be referred to as tilt beam.

It is noted that in any optical disc drive, the objective lens is designed to form, in combination with the material of the optical disc, an optical system which is optimally adapted to a data beam of a certain wavelength (indicated hereinafter as design wavelength), such that, if a light beam having the design wavelength is being used, and if this light beam is substantially parallel (i.e. non-convergent and non-divergent) when entering the objective lens, and if the focus point of this beam coincides with the storage layer of the disc, the reflected beam is substantially free from aberration. This condition will be indicated as the design operation condition, which will be considered as a property of the optical disc drive apparatus. If a second beam is used which does not meet all design operation conditions, the second reflected beam will be subject to some distortion like aberration. As a consequence, in a tilt situation, the detector spot of such second beam, i.e. the light spot caused by such second beam when incident on the detector, is distorted and/or shifted by a different amount than the detector spot of the data beam. In the context of the invention, it is thus sufficient if one of the optical characteristics of the tilt beam differs sufficiently from the corresponding optical characteristic of the data beam.

According to a first example, the tilt beam has a wavelength differing from the wavelength of the data beam. In such a case, the data beam and the tilt beam may be focused to the same focus spot on the record layer of the optical disc.

According to a second example, the focus point of the data beam and the focus point of the tilt beam have different locations on the optical axis, i.e. these focus points have axial distance with respect to each other, such that the tilt beam is out of focus when the data beam is in focus on the record layer of the optical disc. In such a case, the data beam and the tilt beam may have the same wavelength.

According to a third example, the polarization condition of the tilt beam differs from the polarization condition of the data beam, in which case the data beam and the tilt beam may have equal wavelength and equal focus point if the objective lens has refractive properties which are polarization-dependent or if the optical disc has refractive properties which are polarization-dependent, or both.

According to a fourth example, the wavelength of the tilt beam differs from the wavelength of the data beam, while also the focal point of the tilt beam is located at an axial distance from the focal point of the tilt beam.

In the following, for sake of explanation, it will only be considered the case where the first laser 31 and the second laser 41 are different types of laser in that their respective laser beams 32 and 42 have a different wavelength. It is noted that the explanations would be the same with a first and second laser beams having different optical characteristics. For instance, in a combi-drive, a laser beam suitable for handling a CD has a wavelength in the order of about 780 nm, while a laser beam suitable for handling a DVD has a wavelength in the order of about 660 nm.

When a combi-drive is in a CD-playing mode, the tilt beam will be the DVD beam, hence the tilt beam has a shorter wavelength than the data beam. When, on the other hand, the combi-drive is in a DVD-playing mode, the tilt beam will be the CD beam, hence the tilt beam has a longer wavelength than the data beam.

In such conditions, the tilt beam is defocused and/or spherically aberrated when the data beam is in focus.

The disc drive apparatus 1 further comprises an actuator system 50, which comprises a radial actuator 51 for radially displacing the objective lens 34 with respect to the disc 2. Since radial actuators are known per se, while the present invention does not relate to the design and functioning of such an actuator, it is not necessary here to discuss the design and functioning of a radial actuator in great detail.

For achieving and maintaining a correct focusing, exactly on the desired location of the disc 2, said objective lens 34 is mounted axially displaceable, while further the actuator system 50 also comprises a focal actuator 52 arranged for axially displacing the objective lens 34 with respect to the disc 2. Since axial actuators are known per se, while further the design and operation of such axial actuator is no subject of the present invention, it is not necessary here to discuss the design and operation of such focal actuator in great detail.

For the purpose of tilt compensation, said objective lens is mounted such as to be pivotable about a joint (not shown) which preferably coincides with the optical centre of the objective lens 34. Further, the actuator system 50 also comprises a pivot actuator 53, also indicated as tilt actuator, arranged for pivoting the objective lens 34 with respect to the disc 2. The pivot actuator 53 is intended to correct the effect of the radial and tangential tilt from control signals $S_{CTA}$ and $S_{CTB}$, said control signals being derived from radial and tangential tilt angle calculations, respectively, measured according to the present invention.

It is noted that means for supporting the objective lens with respect to an apparatus frame, and means for axially and radially displacing the objective lens, are generally known per se. Since the design and operation of such supporting and displacing means are no subject of the present invention, it is not necessary here to discuss their design and operation in great detail. The same applies to means for pivoting the objective lens.

It is further noted that the radial actuator 51, focal actuator 52, and pivot actuator 53 may be implemented as one integrated 3D-actuator.

The disc drive apparatus 1 further comprises a control circuit 90 having an output 92 connected to a control input of the motor 4, having an output 93 coupled to a control input of the radial actuator 51, having an output 94 coupled to a control input of the focal actuator 52, having a double output 95 coupled to a control input of the pivot actuator 53, and having an output 96 coupled to a control input of the second laser 41. The control circuit 90 is designed:

to generate at its output 92, a control signal $S_{CM}$ for controlling the motor 4, to generate at its control output 93, a control signal $S_{CR}$ for controlling the radial actuator 51, to generate at its output 94, a control signal $S_{CF}$ for controlling the focal actuator 52, to generate at its double output 95, a control signal $S_{CTA}$ for controlling the radial position of the pivot actuator 53, and a control signal $S_{CTB}$ for controlling the tangential position of the pivot actuator 53, to generate at its output 96, a control signal $S_{L2}$ for controlling the second laser beam 41.

The control circuit 90 further has a read signal input 91 for receiving a read signal $S_R$ from the optical detector 35.

Figure 1B:
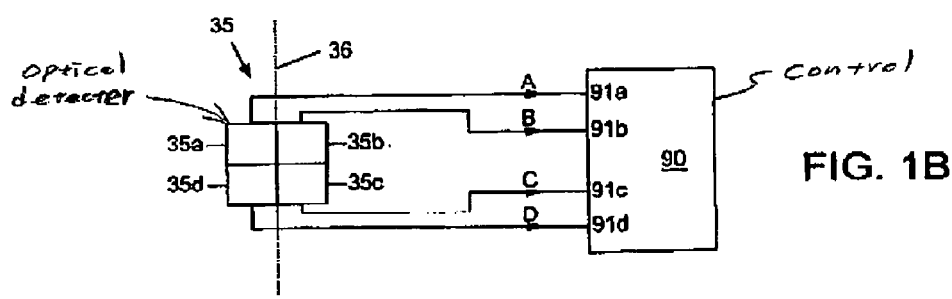
FIG. 1B is a block diagram illustrating schematically an optical detector connected to a signal processor.

FIG. 1B illustrates that the optical detector 35 comprises a plurality of detector segments, in this case four detector segments 35a, 35b, 35c, 35d, capable of providing individual detector signals A, B, C, D, respectively, indicating the amount of light incident on each of the four detector quadrants, respectively. A first line 36, separating the first and fourth segments 35a and 35d from the second and third segments 35b and 35c, has a direction corresponding to the tangential direction (also called track direction). A second line separating the first and second segments 35a and 35b from the fourth and third segments 35d and 35c, has a direction corresponding to the radial direction. Since such four-quadrant detector is commonly known per se, it is not necessary here to give a more detailed description of its design and functioning.

FIG. 1B also illustrates that the read signal input 91 of the control circuit 90 actually comprises four inputs 91a, 91b, 91c, 91d for receiving said individual detector signals A, B, C, D, respectively. The control circuit 90 is designed to process said individual detector signals A, B, C, D, in order to derive data and control information therefrom, as will be clear to a person skilled in the art. The processing can be done by code instructions executed by a signal processor.

A data signal $S_D$ can be obtained by summation of all individual detector signals A, B, C, D according to:

$$S_D = A + B + C + D \qquad (1)$$

Further, a first push-pull radial error signal $S_{TE\_radial}$ can be obtained by summation of the signals A and D from all individual detector segments 35a and 35d on one side of the first line 36, summation of the signals B and C from all individual detector segments 35b and 35c on the other side of the first line 36, and taking the difference of these two summations, according to:

$$S_{TE\_radial}=(A+D)-(B+C) \quad (2a)$$

Further, a second push-pull tangential error signal $S_{TE\_tangential}$ can be obtained by summation of the signals A and B from all individual detector segments 35a and 35b on one side of the second line, summation of the signals C and D from all individual detector segments 35c and 35d on the other side of the second line, and taking the difference of these two summations, according to:

$$S_{TE\_tangential}=(A+B)-(C+D) \quad (2b)$$

Further, assuming that a cylindrical lens (not shown in the figure for sake of simplicity) is placed in front of the optical detector 35, a focal error signal $S_{FE}$ can be obtained by summation of the signals A and C from one pair of individual detector segments 35a and 35c diagonally opposite to each other, summation of the signals B and D from the other pair of individual detector segments 35b and 35d diagonally opposite to each other, and taking the difference of these two summations, according to:

$$S_{FE}=(A+C)-(B+D) \quad (3)$$

In order to compensate light intensity variations of the beam as a whole, these error signals can be normalised by division by the data signal to obtain normalised error signals RES_radial/RES_tangential, and focal error signals FES, according to:

$$RES\_radial=S_{TE\_radial}/S_D \quad (4a)$$

$$RES\_tangential=S_{TE\_tangential}/S_D \quad (4b)$$

$$FES=S_{FE}/S_D \quad (5)$$

The above formulas are basically correct for the data beam individually as well as for the tilt beam individually.

Figure 2:
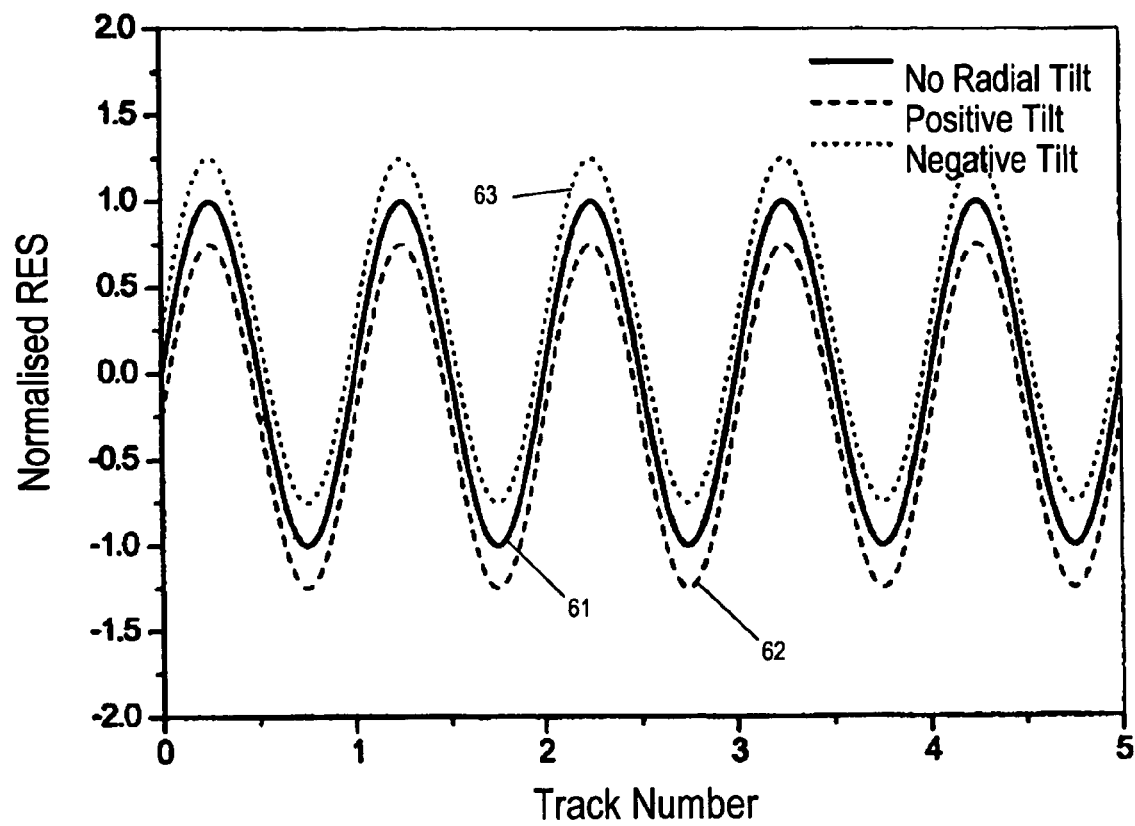
FIG. 2 is a graph illustrating an error signal as a function of radial lens position.

FIG. 2 is a graph illustrating the normalised error signal RES_radial as a function of radial position of the lens 34, for a situation where both the data beam 32 and the tilt beam 42 are ON.

In the case of non-zero disc tilt, the reflected light beams are subject to deflections, the deflection of the tilt beam differing from the deflection of the data beam. As a result, a light intensity pattern caused by the tilt beam on the detector 35 (also indicated as detector tilt spot) will be shifted with respect to a light intensity pattern caused by the data beam on the detector 35 (also indicated as detector data spot). This translates to a DC shift (also called beamlanding) of the normalised error signal RES_radial, as illustrated in FIG. 2.

The horizontal axis indicates track numbers, while the vertical axis indicates signal magnitude in arbitrary units. The solid curve 61 shows the normalised error signal RES_radial in a case without radial tilt of the disc 2: it can be seen that the DC level of this signal is now equal to zero. The dashed and dotted lines 62 and 63 show the same normalised error signal RES_radial for a case where the disc 2 has positive and negative radial tilt (depending on the sign of the tilt angle), respectively: the DC level of this signal has now been shifted to a negative and a positive value, respectively.

Figure 5:
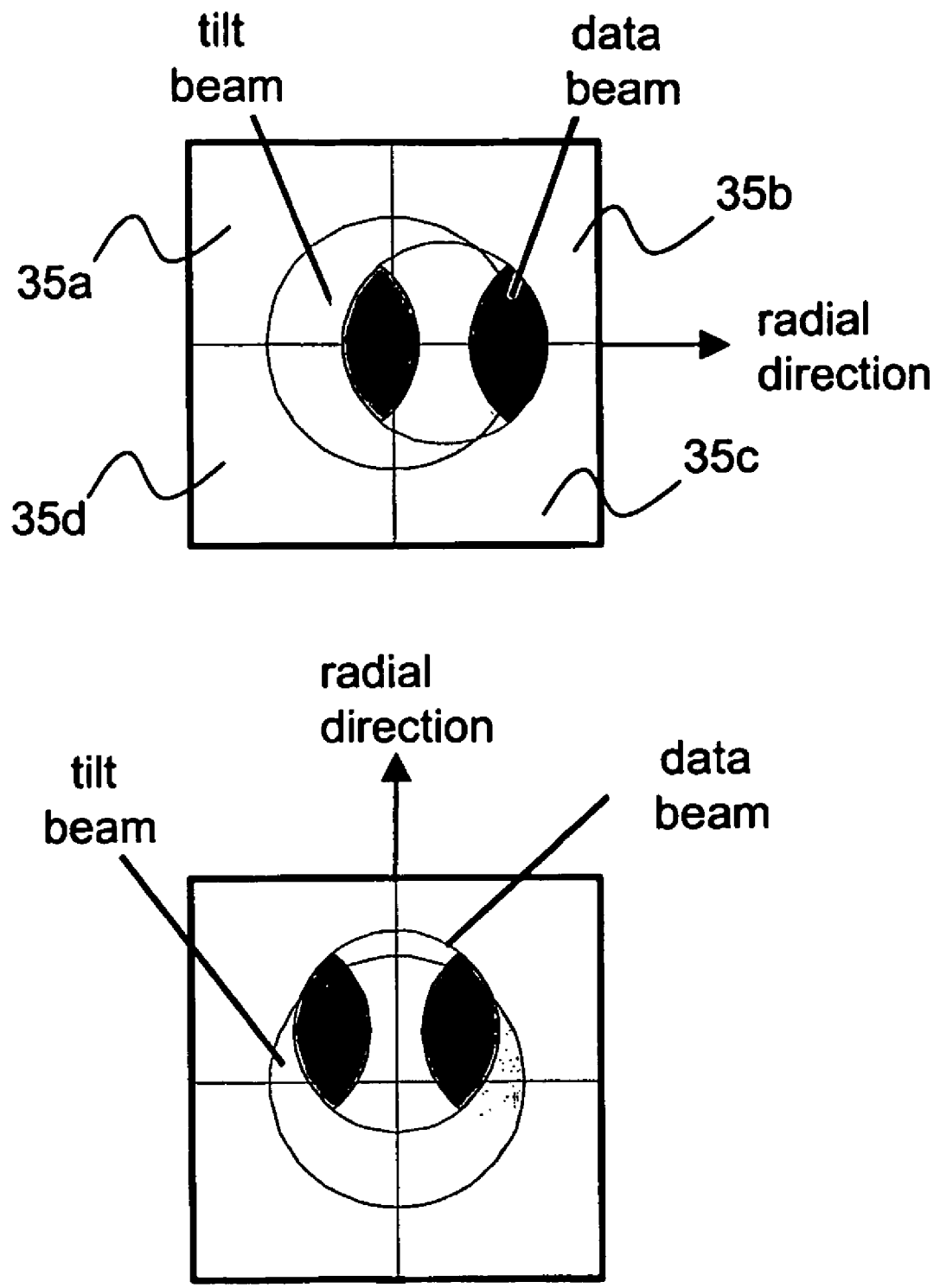
FIG. 5 illustrates the displacement of light beams on a four-quadrants detector.
Figure 6:
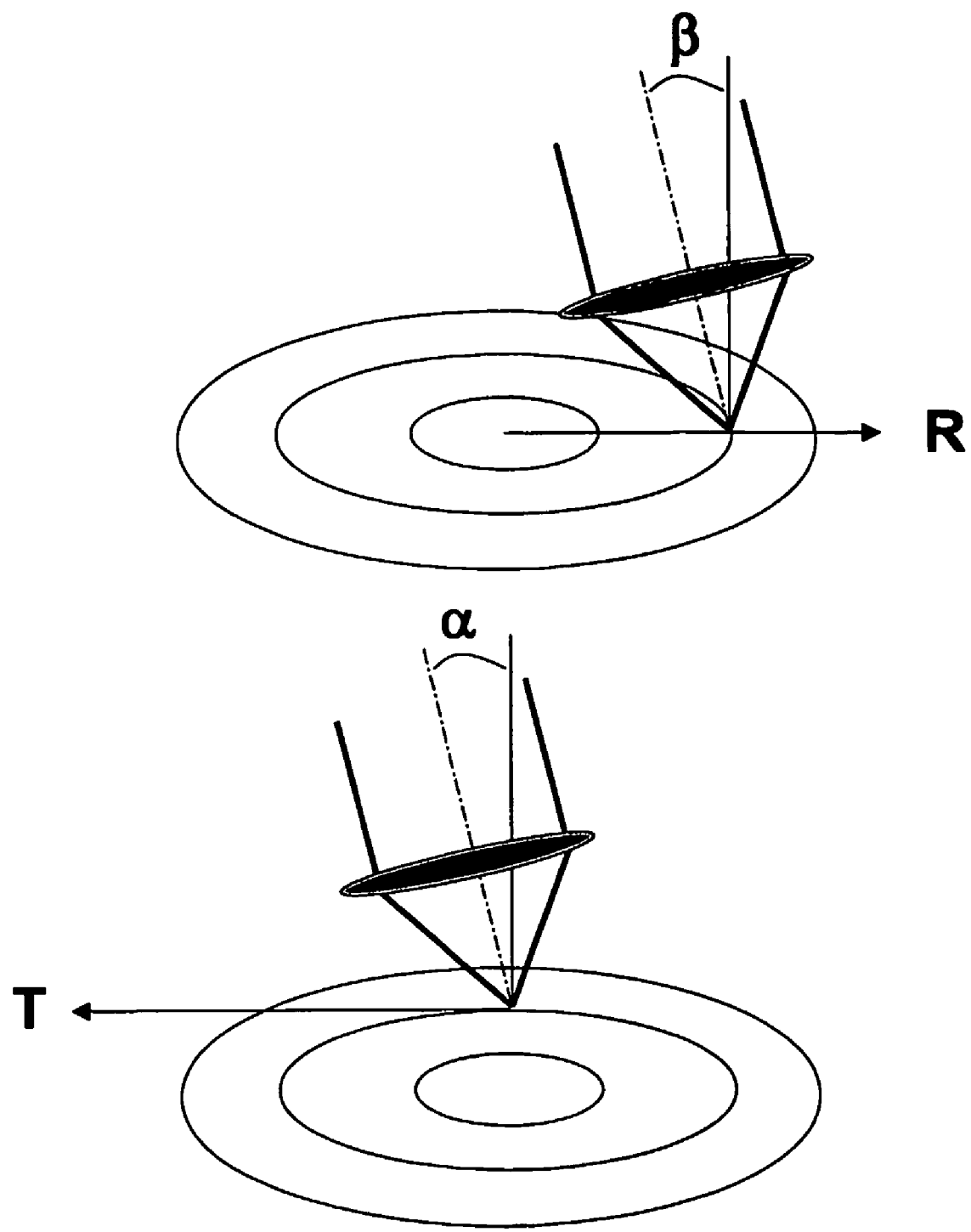
FIG. 6 illustrates a radial tilt and a tangential tilt in an optical data carrier.

Due to radial disc-tilt, the data beam 32 (which is in focus) is displaced in the radial direction of the detector, as depicted in the upper part of FIG. 5. Since the tilt beam 42 (which is out of focus) is severely aberrated because of lowest-order spherical aberration, its displacement in the radial direction due to radial tilt is much less, as depicted in the lower part of FIG. 5. The same goes for the situation with tangential disc-tilt. On the contrary, radial beam-landing (BL) caused by a radial displacement of the objective lens (OL) (as would occur during tracking operation) is the same for the first and second beams.

For a given optical disc, it can be demonstrated that the DC level measured in applying only the data beam 32 is proportional to the disc tilt, and that the DC level measured in applying only the tilt beam 42 is also proportional to the disc tilt, with a-priori different proportionality coefficients. As a consequence, the difference of these two DC levels is also proportional to the disc tilt. Moreover, it can be demonstrated that this difference is proportional to the difference between the DC level measured in applying simultaneously the data and tilt beam 32 and 42, and the DC level measured in applying only the data beam 32. As a consequence, the difference between the DC level in applying simultaneously the data and tilt beam 32 and 42, and the DC level measured in applying only the data beam 32, is proportional to the disc tilt, either radial or tangential.

The radial and tangential disc tilt can thus be measured without interrupting the data beam 32 used for read or write operations, but in switching ON the tilt beam while the data beam 32 is ever applied on the optical disc.

A radial tilt angle θ_radial and a tangential tilt angle θ_tangential can be calculated as the difference between two intermediate values:

$$\theta\_radial=DC[RES\_radial(T+D)]-DC[RES\_radial(D)] \quad (6a)$$

$$\theta\_tangential=DC[RES\_tangential(T+D)]-DC[RES\_tangential(D)] \quad (6b)$$

wherein:
DC[x] indicates the DC level of a signal x,
RES_radial (D) indicates the normalised error signal RES_radial for a case with only the data beam being switched ON,
RES_tangential (D) indicates the normalised error signal RES_tangential for a case with only the data beam being switched ON,
RES_radial (T+D) indicates the normalised error signal RES_radial for a case with both the data beam and the tilt beam being switched ON,
RES_tangential (T+D) indicates the normalised error signal RES_tangential for a case with both the data beam and the tilt beam being switched ON.

It is noted that the illustrative FIG. 2 relates to a situation of track crossings for a case where a tracking servo loop is open. However, during normal disc drive operation, the tracking servo loop is closed in order to have the focal spot F stay on track, so that the radial actuator 51 is controlled to keep the normalised error signals RES_radial and RES_tangential equal to zero. Consequently, in view of the shifted DC level of RES_radial and RES_tangential, the focal spot F is actually displaced with respect to the centre of the track being followed.

In the following, statement RES will stand either for RES_radial or RES_tangential indifferently for facilitating the understanding.

Figure 3:
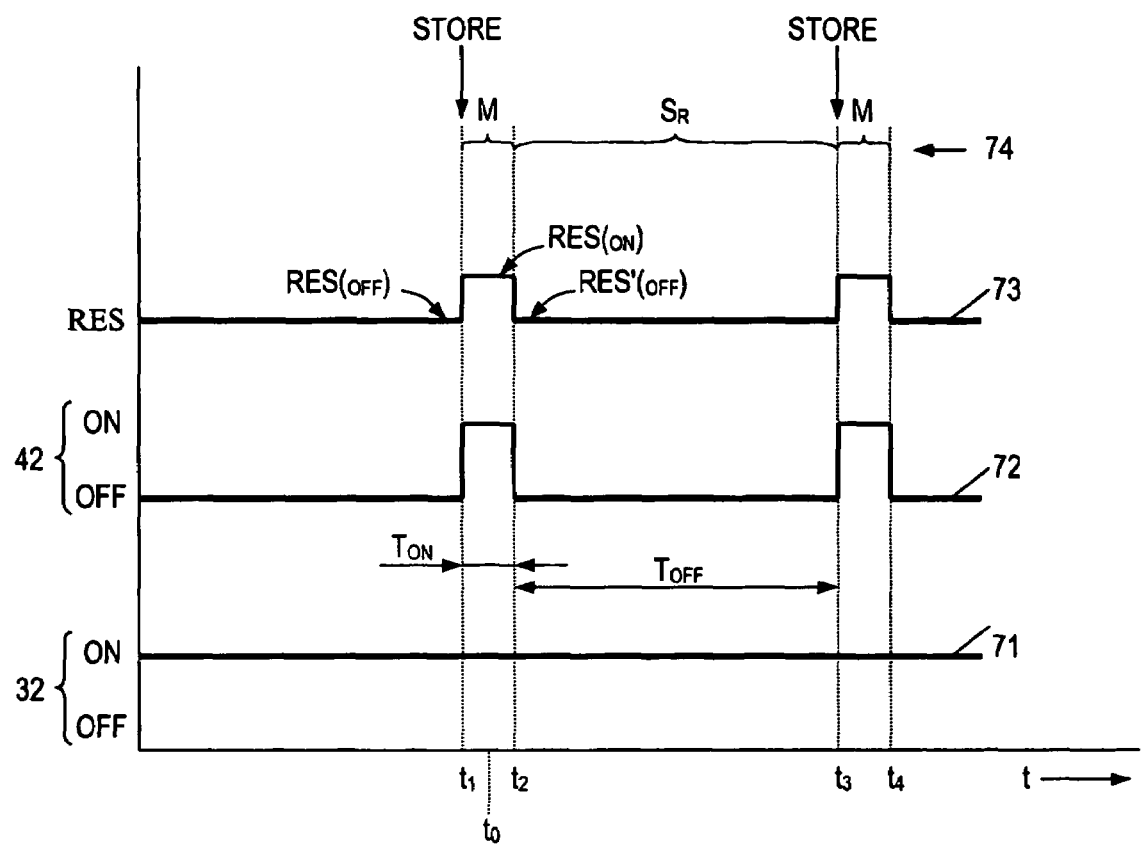
FIG. 3 is a timing diagram illustrating the operation of a disc drive in accordance with the present invention.

FIG. 3 is a timing diagram illustrating the operation of the disc drive 1 in accordance with the present invention. Curve 71 represents the operation of the data beam 32, which is constantly switched ON. Curve 72 represents the operation of the tilt beam 42. Normally, the tilt beam 42 is switched OFF, but at regular intervals the tilt beam 42 is briefly switched ON. In FIG. 3, the tilt beam is switched ON at times t1 and t3, and switched OFF at times t2 and t4.

$T_{ON}$ indicates a time period during which the data beam 32 is switched ON and the tilt beam 42 is switched ON, having a duration $\tau_{ON}$=t2−t1. This time period will be indicated as tilt measuring phase.

$T_{OFF}$ indicates a time period during which the data beam 32 is switched ON and the tilt beam 42 is switched OFF, having a duration $\tau_{OFF}$=t3−t2. This time period will be indicated as normal phase.

Curve 73 illustrates the normalised error signal RES in a closed radial servo loop situation, while an operational mode of the control circuit 90 is illustrated at 74. During the normal phase $T_{OFF}$, the control circuit 90 uses the normalised error signal RES as calculated from the optical detector 35 output signal $S_R$ for controlling the radial actuator 51, as normal, indicated by $S_R$ in FIG. 3.

At the times t1 and t3, the control circuit 90 stores the current values of the signals $S_D$, RES and FES in a memory 97, after which the control circuit 90 switches the second laser 41 to its ON state.

The values of the signals $S_D$, RES and FES thus stored, measured during the normal phase $T_{OFF}$, will be indicated as $S_D$(OFF), RES(OFF) and FES(OFF), respectively.

During the tilt measuring phase $T_{ON}$, the control circuit 90 generates its actuator control signals $S_{CR}$, $S_{CF}$, $S_{CTA}/S_{CTB}$ for the radial actuator 51, the focus actuator 52 and the pivot actuator 53, respectively, on the basis of the values of the signals $S_D$(OFF), RES(OFF) and FES(OFF) read from memory 97, indicated by M in FIG. 3.

At the times t2 and t4, the control circuit 90 switches the second laser 41 to its OFF state, after which the control circuit 90 returns to normal operation ($S_R$).

In order to measure tilt, the control circuit 90 also measures a value of the error signal RES from the optical detector 35 output signal $S_R$ during the tilt measuring phase $T_{ON}$. This measured value may be one sample, for instance taken at approximately time t1+0.5*$\tau_{ON}$, or an average of multiple samples taken during the tilt measuring phase $T_{ON}$. This measured value will be indicated as RES(ON). This measured value RES(ON) may be processed immediately, or also stored in memory 97.

The control circuit 90 is now able to derive a tilt-indicating signal $S_{TILT}$ indicative of the disc tilt angle θ on the basis of RES(OFF) and RES(ON). The tilt-indicating signal $S_{TILT}$ may be calculated as the difference between two intermediate values:

$$S_{TILT}=RES(ON)-RES(OFF) \quad (7)$$

Alternatively, it is also possible that the control circuit 90 measures the value of the error signal RES shortly after termination of the tilt measuring phase $T_{ON}$, this measured value being indicated as RES'(OFF). Then, the control circuit 90 is able to derive a tilt-indicating signal $S_{TILT}$ on the basis of RES'(OFF) and RES(ON). The tilt-indicating signal $S_{TILT}$ may be calculated as:

$$S_{TILT}=RES(ON)-RES'(OFF) \quad (8)$$

Preferably, the control circuit 90 is designed to measure RES(OFF) at time t1 (or shortly before) and to also measure RES'(OFF) at time t2 (or shortly after), to average these two measures, and to calculate the tilt-indicating signal $S_{TILT}$ as:

$$S_{TILT}=RES(ON)-(RES(OFF)+RES'(OFF))/2 \quad (9)$$

Further, the control circuit 90 is designed to generate a control signal $S_{CTA}/S_{CTB}$ for the pivot actuator 53 such that the radial/tangential tilt-indicating signal $S_{TILT}$ decreases, ideally becoming zero, indicating that the pivot actuator 53 has obtained a position well-matched to the disc tilt. A closed loop-control can be used to this end.

Experiments have been performed with a DVD disc rotating at a frequency of approximately 4.7 Hz. These experiments have shown that it is possible to have a duration $\tau_{ON}$ of the tilt measuring phase $T_{ON}$ of 150 μs without affecting the data readout or the stability of the radial servo loop. Further, no significant increase in the jitter has been observed in these experiments. This means that the chance that the optical pickup deviates from track during a period of 150 μs may be ignored. On the other hand, this period is long enough for obtaining adequate measuring samples from the tilt beam.

Each tilt measuring phase $T_{ON}$ corresponds, in fact, with a tilt measurement at substantially one location on disc. In the case of a disc rotation at 4.7 Hz, a tilt measuring duration $\tau_{ON}$ of 150 μs corresponds, at a track radius of 5 cm, to a track portion of approximately 0.2 mm. As should be clear to a person skilled in the art, the number of tilt measurements per disc revolution can suitably be set by setting an appropriate value for the duration of the normal phase $T_{OFF}$. This duration $T_{OFF}$ should preferably be selected above a certain minimum duration in order to allow the actuator system 50 to obtain a stable position. For the parameters given above, a suitable value for such minimum duration is approximately 1 ms.

In FIG. 3, the basic principle of the present invention is illustrated by showing that the tilt beam 42 is repeatedly switched ON and OFF, illustrated by a rectangular curve 72 which defines the tilt measuring phase $T_{ON}$ and the normal phase $T_{OFF}$. This curve is not to be interpreted as meaning that the light intensity profile of the tilt beam 42 should only have a rectangular shape.

Figure 4A:
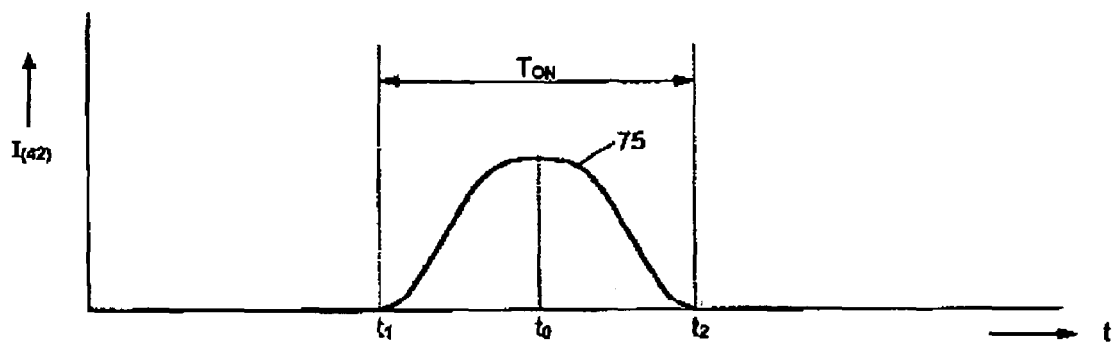
FIG. 4 is a block diagram schematically illustrating components of a preferred embodiment of a control circuit.

On a larger scale than FIG. 3, FIG. 4A illustrates a preferred light intensity profile of the tilt beam 42, indicated by curve 75. The vertical axis of FIG. 4A indicates light intensity, the horizontal axis indicates time.

At times t before t1 and after t2, the light intensity I(42) is zero. At time t1, the light intensity I(42) starts to rise, obtains a maximum at a time t0=(t1+t2)/2, and then decreases continuously to become zero at time t2. The shape of curve 75 between times t1 and t2 is a preferably cosine shape symmetrical with respect to time t0. This particular shape prevents from spectral components in the data frequency range.

Figure 4B:
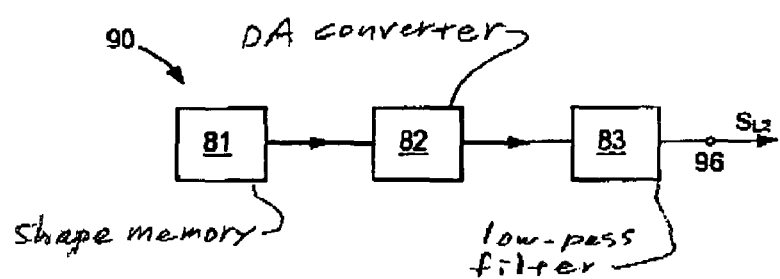

In order to provide such light intensity profile, the control circuit 90 preferably comprises a shape memory 81, a digital-to-analog converter 82, and a low-pass filter 83, as illustrated in FIG. 4B. The shape memory 81 contains information on the shape of the light intensity profile to be produced, for instance in the form of a formula or a look-up table. With such a cosine shape, it is prevented that spectral components in the data frequency range are introduced into the optical detector 35 output signal $S_R$.

It should be clear to a person skilled in the art that the present invention is not limited to the exemplary embodiments discussed above, but that various variations and modifications are possible within the protective scope of the invention as defined in the appending claims.

For instance, in the above it is explained that the signals $S_D$, RES and FES are stored in memory and that the control circuit 90 generates, during the tilt measuring phase $T_{ON}$, its actuator control signals $S_{CR}$, $S_{CF}$, $S_{CTA}/S_{CTB}$ on the basis of these stored values in order to freeze the actuator positions. However, it is also possible that these actuator control signals $S_{CR}$, $S_{CF}$, $S_{CTA}/S_{CTB}$ themselves are stored in memory, and that the control circuit 90, during the tilt measuring phase $T_{ON}$, generates its actuator control signals $S_{CR}$, $S_{CF}$, $S_{CTA}/S_{CTB}$ by reading the memory and repeating the values read from memory. Further, if the actuators 51, 52, 53 are relatively slow, and/or if the tilt measuring phase duration $\tau_{ON}$ is relatively short, it is possible that the actuators do not respond to the change in the normalised radial error signal RES illustrated by curve 73, in which case it is not necessary to freeze the actuator control signals. However, freezing the actuator control signals provides an increased robustness of the system.

The disc drive apparatus 1 may be designed for handling only one type of disc, i.e. either CD or DVD for example. In that case, the data beam 32 will have the wavelength mentioned for use with CD or DVD, respectively, while the tilt beam 42 is an auxiliary laser beam which may have, in principle, any suitable wavelength differing sufficiently from the data beam wavelength. In such an apparatus, the data beam 32 is focused while the auxiliary tilt beam is out of focus and/or spherically aberrated.

The disc drive apparatus 1 may also correspond to a combi-drive. The disc drive apparatus 1 is thus designed for handling two or more types of disc, i.e. CD as well as DVD for example. In that case, the data beam 32 will have the wavelength mentioned for use with CD or DVD, respectively, while the tilt beam 42 will have the wavelength mentioned for use with DVD or CD, respectively. In such an apparatus, the CD-type beam is focused when a CD is being handled, in which case the DVD-type beam is out of focus and/or spherically aberrated. Alternatively, the DVD-type beam is focused when a DVD is being handled, in which case the CD-type beam is out of focus and/or spherically aberrated.

The invention claimed is:

1. Method of measuring the tilt of an optical disc (2) in an optical disc drive (1), said method comprising:
    a step of directing to the optical disc during a normal phase ($T_{OFF}$), a first laser beam (32) having a first optical characteristic for writing/reading information into/from the optical disc,
    a step of deriving a first intermediate value (RES(OFF)) from a first normalized error signal obtained after reflection of said first laser beam (32) on the optical disc,
    a step of directing to the optical disc during a tilt-measuring phase ($T_{ON}$), said first laser beam (32) and a second laser beam (42) having a second optical characteristic,
    a step of deriving a second intermediate value (RES(ON)) from a second normalized error signal obtained after reflection of said first and second laser beams (32, 42) on the optical disc,
    a calculation step of deriving a tilt-indicative signal ($S_{TILT}$) from the difference between said second and first intermediate values.

2. Method according to claim 1, wherein the first laser beam (32) has a first wavelength and wherein the second laser beam (42) has a second wavelength.

3. Method according to claim 2, wherein the second laser beam (42) has a focus point coinciding with a focus point of the first laser beam (32).

4. Method according to claim 1, wherein:
    the first laser beam (32) has a first focus point,
    the second laser beam (42) has a second focus point located at an axial distance from the first focus point.

5. Method according to claim 4, wherein the first laser beam (32) and the second laser beam (42) have the same wavelength.

6. Method according to claim 1, wherein:
    the first laser beam (32) has a first wavelength, and the second laser beam (42) has a second wavelength,
    the first laser beam (32) has a first focus point, and the second laser beam (42) has a second focus point located at an axial distance from the first focus point.

7. Method according to claim 1, wherein, in the tilt measuring phase ($T_{ON}$), the intensity of the second light beam (42) is intended to continuously rise from zero to a maximum value at approximately half-time (t0) of the tilt measuring phase ($T_{ON}$), and subsequently intended to continuously decrease from said maximum value to zero.

8.) Method according to claim 1, wherein:
    the first intermediate value (RES(OFF)) is obtained shortly before the start (t1) or shortly after the end (t2) of the tilt measuring phase ($T_{ON}$),
    the second intermediate value (RES(ON)) is obtained within the tilt measuring phase ($T_{ON}$).

9. Method according to claim 8, wherein the second intermediate value (RES(ON)) is obtained from a measure obtained at a central time (t0) within the tilt measuring phase ($T_{ON}$).

10. Method according to claim 1, wherein:
    the first intermediate value (RES(OFF)) is derived from the average of a first measure obtained shortly before the start (t1) of the tilt measuring phase ($T_{ON}$), and a second measure obtained shortly after the end (t2) of the tilt measuring phase ($T_{ON}$),
    the second intermediate value (RES(ON)) is obtained within the tilt measuring phase ($T_{ON}$).

11. Method according to claim 1, further comprising a step of freezing, during the tilt measuring phase ($T_{ON}$), the actuation of at least one lens actuator of the optical disc drive (1).

12. Optical disc drive (1) for writing/reading information into/from an optical disc (2), said optical disc drive (1) comprising means for measuring the tilt of said optical disc (2), said means comprising:
    first means for generating and directing to the optical disc during a normal phase ($T_{OFF}$), a first laser beam (32) having a first optical characteristic for writing/reading information into/from the optical disc,
    calculation means (90) for deriving a first intermediate value (RES(OFF)) from a first normalized error signal obtained after reflection of said first laser beam (32) on the optical disc,
    second means for generating and directing to the optical disc during a tilt-measuring phase ($T_{ON}$), said first laser beam (32) and a second laser beam (42) having a second optical characteristic,
    calculation means (90) for deriving a second intermediate value (RES(ON)) from a second normalized error signal obtained after reflection of said first and second laser beams (32, 42) on the optical disc,
    calculation means (90) for deriving a tilt-indicative signal ($S_{TILT}$) from the difference between said second and first intermediate values.

13. Optical disc drive according to claim 12, wherein the first laser beam (32) has a first wavelength and wherein the second laser beam (42) has a second wavelength.

14. Optical disc drive according to claim 13, wherein the second laser beam (42) has a focus point coinciding with a focus point of the first laser beam (32).

15. Optical disc drive according to claim 12, wherein:
    the first laser beam (32) has a first focus point,
    the second laser beam (42) has a second focus point located at an axial distance from the first focus point.

16. Optical disc drive according to claim 15, wherein the first laser beam (32) and the second laser beam (42) have the same wavelength.

17. Optical disc drive according to claim 12, wherein:

the first laser beam (32) has a first wavelength and wherein the second laser beam (42) has a second wavelength, the first laser beam (32) has a first focus point and wherein the second laser beam (42) has a second focus point located at an axial distance from the first focus point.

18. Optical disc drive according to claim 12, further comprising:

an objective lens (34), lens actuators (51, 52, 53) for positioning the objective lens (34), means for freezing, during the tilt measuring phase ($T_{ON}$), the actuation of at least one lens actuator (51, 52, 53).

19. Optical disc drive according to claim 12, intended to handle one disc type (for example CD or DVD or Blu-Ray) only, wherein the second light generating device (41) is an auxiliary light source.

20. Optical disc drive according to claim 12, intended to handle at least two different disc types (for example: CD, DVD, Blu-Ray), wherein:

the first means for generating and directing are adapted to generate the first light beam (32) suitable for handling a first one of said disc types, the second means for generating and directing are adapted to generate the second light beam (42) suitable for handling a second one of said disc types.

* * * * *